Jan. 8, 1929.
H. P. KRAFT
1,698,503
COMBINED DUST CAP AND VALVE CAP
Original Filed May 9, 1923
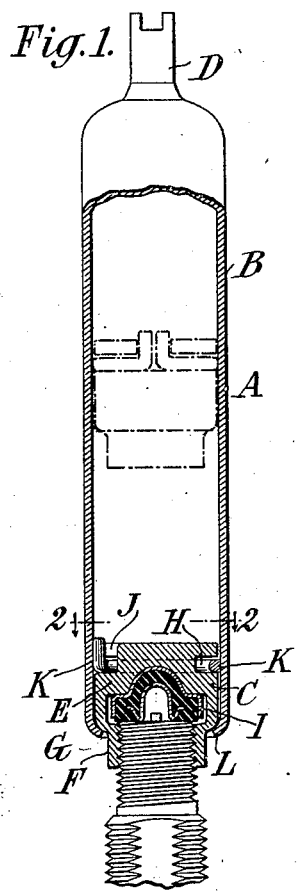
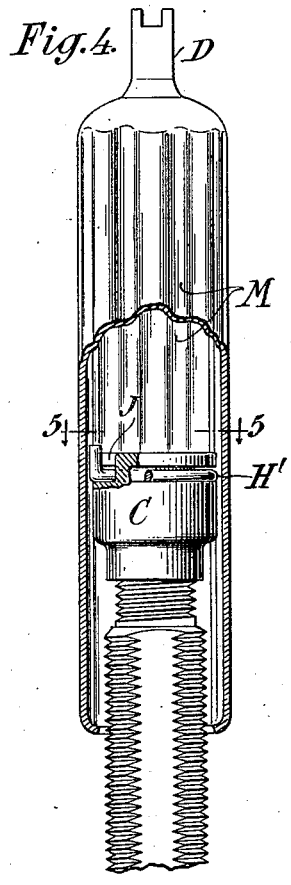
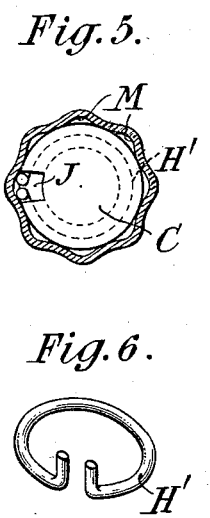
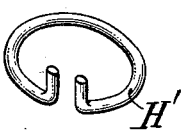
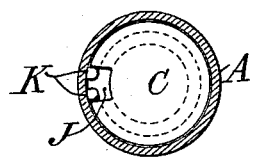
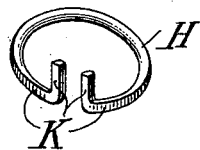
INVENTOR :
Henry Phillip Kraft,
By Attorneys,
Fraser, Turk & Myers.

Patented Jan. 8, 1929.

1,698,503

UNITED STATES PATENT OFFICE.

HENRY PHILLIP KRAFT, OF RIDGEWOOD, NEW JERSEY; EDGAR J. PHILLIPS AND EARL A. DARR, EXECUTORS OF THE WILL OF HENRY P. KRAFT, DECEASED, ASSIGNORS TO A. SCHRADER'S SON, INCORPORATED, OF BROOKLYN, NEW YORK, A CORPORATION OF NEW YORK.

COMBINED DUST CAP AND VALVE CAP.

Application filed May 9, 1923, Serial No. 637,672. Renewed July 7, 1926.

This invention relates to a combined dust cap and valve cap for pneumatic tire valves and aims to provide certain useful improvements therein.

In devices of this kind heretofore proposed, the valve cap was so positioned within the dust cap as to be longitudinally slidable but relatively non-rotatable with relation to the dust cap. This relationship between the dust cap and valve cap was brought about by said caps having similar polygonal or other non-circular cross sectional contours. In such constructions, however, it was found that owing to the leverage action existing between the dust cap and valve cap, too great a turning force was usually communicated to the valve cap in the course of applying the caps to the valve casing. The strain upon the packing gasket brought about in this way frequently injured the gasket to such extent as to render it ineffective as a check against leakage through the valve.

According to the present invention the aforementioned and other disadvantages inherent in devices of the character described are entirely overcome. This I accomplish by making the dust cap and valve cap relatively rotatable and introduce sufficient friction between the two to enable the dust cap to screw down the valve cap upon the valve stem or the like with enough force to make a tight joint between the valve cap washer and the valve stem. I preferably accomplish this result by having the valve cap relatively slidable and rotatable within the dust cap and employing a single frictional means between the two caps, preferably in the form of a split spring ring, for holding the valve cap against both rotative and longitudinal action when there is no strain tending to displace it. The invention also includes other features of novelty which will be hereinafter more fully set forth.

In the accompanying drawing wherein I have shown two embodiments of my invention,—

Figure 1 shows an embodiment of the invention in longitudinal section, the top of the dust cap being shown in elevation.

Fig. 2 is a transverse section taken on the line 2—2 of Fig. 1.

Fig. 3 is a perspective view of a detail of the invention.

Fig. 4 is a view similar to Fig. 1, showing a modification.

Fig. 5 is a section taken on the line 5—5 of Fig. 4, and

Fig. 6 is a perspective view of a detail shown in the modified form of the invention.

Referring to Figs. 1 to 3 of the drawings, let A indicate the combined dust cap and valve cap as a whole which comprises the dust cap member B and the valve cap member C. The dust cap as herein shown consists of a hollow shell of circular cross section open at one end and closed at its other end, which latter is preferably formed with a screwdriver projection D for removing the valve insides from a tire valve casing. The valve cap C as herein shown consists of a body portion E of circular cross section adapted for sliding and rotational movement with respect to the dust cap, and an internally threaded skirt portion F of smaller diameter than the body portion adapted for screw threaded engagement with the end of a valve casing. Within the valve cap is the usual packing gasket and anti-friction member designated as a whole by the reference letter G, said gasket being adapted to provide an air-tight seal with the end of a valve casing.

According to the present invention, rotational movement is communicated to the valve cap by the dust cap through the medium of a frictional means on the valve cap engaging the interior wall of the dust cap. Said frictional means is preferably so constituted as to permit both cap members to be rotated as a unit until the frictional resistance between the two is reduced to a point where one of the caps can be slipped completely around the other upon continuing the turning force. According to the present disclosure said frictional means has the form of a split spring ring H seated in a groove I on the body portion of the valve cap. The ends of the spring are preferably bent upward at right angles to the plane of the ring and seat in a recess J on the valve cap body. These longitudinal portions of the ring provide increased frictional engagement with the dust cap tending to retard relative rotation between the two caps. To further increase the frictional engagement, the face of the ring adapted to contact with the dust cap may be made flat as shown at K. The valve cap, as thus constituted, it will be understood, is at all times adapted for slidable action longitudinally of the dust cap and for relative rotational movement with respect to the dust cap only after the packing gasket G engages the top of the valve casing, which engagement is sufficient to permit the slip-frictional rotation of the dust cap around the valve cap. To prevent the withdrawal of the valve cap from the dust cap during the act of removing caps from a valve casing, the open end of the dust cap L is turned inwardly to overlap the body portion E of the valve cap.

In the modification shown in Figs. 4 to 6, the dust cap instead of being of circular cross section has its wall fluted to provide a series of longitudinal grooves M, the function of which is to provide additional frictional engaging surface for the longitudinal portions of the split ring, thus further insuring co-operative rotational movement between the dust cap and valve cap under normal use. In all other respects the construction is the same as that disclosed in Figs. 1 to 3, with the exception that the split spring ring H' is of circular cross section rather than being formed with a flat contacting face.

In the use of the present invention I may start with the valve cap in any position within the dust cap. The dust cap is applied over the valve casing until the valve cap engages the end of the casing, whereupon by turning the dust cap the valve cap is screwed home upon the casing. Upon further turning the dust cap it will be found to slip around the valve cap and may then be pushed downwardly to engage the rim nut or felloe of the wheel. The slip frictional engagement between the dust cap and valve cap insures against a strain being applied to the packing gasket sufficient to injure same, as is possible in the constructions heretofore proposed wherein the valve cap and dust cap are not relatively rotatable. The device may be removed from the valve casing by either reversing the preceding operations or by merely turning the dust cap to the left to unscrew the valve cap. By employing the latter method the valve cap will be found to occupy a definite position within the dust cap, such that in subsequent applications of the device a mere turning of the dust cap to the right will suffice to apply both caps. The frictional engagement between the valve cap and dust cap, it will be understood, is at all times sufficient to insure against accidental relative longitudinal movement, as for example, by the careless pushing of the dust cap over the valve casing in the course of applying the same.

By the present invention I am enabled to screw down the valve cap to an extent which prevents the over-straining of the washer and its rapid destruction, it being impossible to tighten the cap any more than is permitted by the frictional retardation of the valve cap in the dust cap, so that the latter by its greater diameter and manipulating surface cannot be used to destroy the valve cap washer.

While I have shown and described the preferred embodiments of my invention, it will be understood that I do not wish to be limited to the specific disclosure, since various changes may be made therein without departing from the spirit of the invention.

What I claim is:

1. In combination, a dust cap, a valve cap and co-operating frictional means on said caps, said frictional means comprising a split spring ring having a portion thereof extending in a direction circumferentially of the caps and a portion extending longitudinally of the caps.

2. In combination, a dust cap having internal longitudinal grooves, a valve cap slidable in said dust cap and frictional means on the valve cap adapted to engage in said grooves to provide a slip frictional engagement between the caps to permit them to be rotated as a unit or relatively to each other.

3. In combination, a dust cap having internal longitudinal grooves, a valve cap slidable in said dust cap and the valve cap having a split spring ring having parts adapted to engage in said grooves to provide a slip frictional engagement between the caps to permit them to be rotated as a unit or relatively to each other.

4. In combination, a dust cap having a non-circular contour and a valve cap slidable and rotatable within said dust cap, said valve cap having a recess, spring means in said recess, and a member having a working face to fit the internal contour of the dust cap held in contact therewith by said spring means.

In witness whereof, I have hereunto signed my name.

HENRY PHILLIP KRAFT.